United States Patent
Chu

(10) Patent No.: US 8,311,339 B2
(45) Date of Patent: Nov. 13, 2012

(54) METHOD TO ROBUSTLY MATCH IMAGES WITH SIMILAR BODY AND HEAD POSE FROM IMAGE SEQUENCE

(75) Inventor: Maurice K. Chu, Burlington, CA (US)

(73) Assignee: Palo Alto Research Center Incorporated, Palo Alto, CA (US)

( * ) Notice: Subject to any disclaimer, the term of this patent is extended or adjusted under 35 U.S.C. 154(b) by 1041 days.

(21) Appl. No.: 12/265,437

(22) Filed: Nov. 5, 2008

(65) Prior Publication Data

US 2010/0111426 A1 May 6, 2010

(51) Int. Cl.
*G06K 9/62* (2006.01)
*H04N 5/222* (2006.01)

(52) U.S. Cl. ............ 382/209; 348/333.01; 348/E05.022

(58) Field of Classification Search ................... 382/209; 348/333.01, E05.022
See application file for complete search history.

(56) References Cited

U.S. PATENT DOCUMENTS

| | | | |
|---|---|---|---|
| 7,453,493 B2* | 11/2008 | Pilu | 348/208.6 |
| 7,584,086 B2* | 9/2009 | Frankel | 703/10 |
| 7,739,033 B2* | 6/2010 | Murata et al. | 701/468 |
| 7,948,481 B2* | 5/2011 | Vilcovsky | 345/204 |
| 2008/0151101 A1* | 6/2008 | Tian et al. | 348/448 |

OTHER PUBLICATIONS

Sand and Teller, "Video Matching" ACM Transactions on Graphics (TOG) 222, 3, pp. 592-599 (2004).*
Beauchemin, S. S., and Barron, J. L. 1995. The computation of optical flow. ACM Computing Surveys 27, 3, 433-467.*
Nicola Ancona and Tomaso Poggio, "Optical Flow from 1-D Correlation: Application to a Simple Time-to-Crash Detector", International Journal of Computer Vision, 14, 131-146 (1995).*

* cited by examiner

*Primary Examiner* — Wesley Tucker
*Assistant Examiner* — Ha Le
(74) *Attorney, Agent, or Firm* — Shun Yao; Park, Vaughan, Fleming & Dowler LLP

(57) ABSTRACT

During shopping, a shopper looks at herself in a mirror to evaluate clothing, jewelry, etc. because the mirror can provide a third-person view of the item. One thing a mirror cannot do is to show how two different items look at the same time, because only one item can be tried on at a time. Because of this, shoppers will often repeatedly try on items and must compare the look from memory. To enable self-comparison visually rather than from memory, embodiments can detect matches between images from two separate recorded single camera video sequences (corresponding to two different fittings). The matched images can then be played back to the user in close visual proximity for easy comparison shopping.

30 Claims, 6 Drawing Sheets

METHOD TO ROBUSTLY MATCH IMAGES WITH SIMILAR BODY AND HEAD POSE FROM IMAGE SEQUENCE

BACKGROUND

1. Field

The present disclosure relates to retail fitting room systems. More specifically, the present disclosure relates to a method and an apparatus that enable a user to visually and simultaneously compare the effects of multiple pieces of clothing and other wearable items in front of a mirror by robustly matching body and head poses from two image sequences to permit comparison shopping.

2. Related Art

Shopping for clothes, jewelry, or other wearable items is a common activity which can be carried out either online or in physical stores. A common practice in a physical store is to search the inventory for items of interest, select a few for comparison and try them on to decide which, if any, to purchase. The shopper evaluates the wearable items according to how well they fit physically, and also how well they fit the image of herself that she wants others to perceive. That is, the shopper not only checks whether a garment fits her body, but also whether it fits her style.

For clothing in particular, a shopper typically would like to compare multiple pieces of clothing in a fitting room. Modern sensing technologies can augment this experience. Some dressing rooms identify the garment as the shopper takes it in (e.g., by RFID readers), providing additional information about the garment's price and alternate colors and sizes—the kind of information shoppers can find when browsing products online. Some other technologies in fitting rooms include a video camera that records the shopper's movements and plays back the video to the shopper.

Techniques have been developed for showing the user in prior fittings (e.g., show a picture with a first article of clothing or jewelry while the user is wearing a second). Further, techniques for matching two recorded video sequences have been developed. See, e.g., Sand and Teller, "Video Matching" ACM Transactions on Graphics (TOG) 222, 3, pp. 592-599 (2004).

DETAILED DESCRIPTION

Overview

Figure 1A:
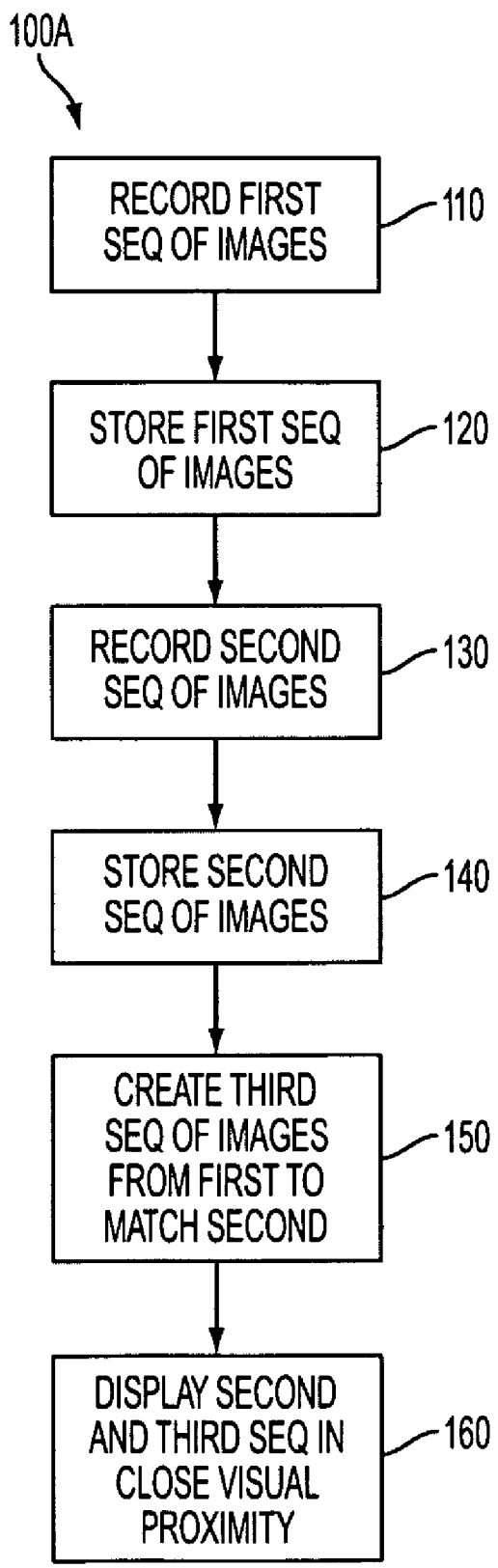
FIG. 1A presents an exemplary process for robustly matching two prerecorded video sequences in a batch mode.

Retail shopping comparison can require a customer to repeatedly try on a series of clothing articles, jewelry pieces, or other wearable items (e.g., eye glasses, sunglasses, handbags, etc.) to assess how they look in one versus another. If a shopper wishes to compare several hats, or pairs of earrings, she/he may end up holding up different items in various ways against a mirror to assess how they look. Embodiments of the invention provide a system and methods to improve this process.

The discussion is organized as follows. First a high-level description of one embodiment is described briefly. Next, the system is described in greater detail including the associated processes and user interaction. Then, details of video matching algorithms used by embodiments are discussed. Lastly, various alternative embodiments are discussed.

For brevity, in the rest of this discussion, the terms "item", "clothing", "jewelry", and "wearable item" will be used interchangeably. Similarly the terms "shopper" and "user" will be used interchangeably and the singular female pronoun used. The term "pose" as used herein means a user in a particular body configuration when the user is wearing a particular piece of clothing, such as body position and posture. For example, a pose can refer to the angular position of the user with respect to the mirror or display. A pose can also refer to the user's gesture, such as raising a leg, holding up an arm, sitting down, or orienting the head. The term "near real-time" as used herein means the delay introduced, by automated data processing or network transmission, between the occurrence of an event and the use of the processed data, e.g., for display or feedback and control purposes. In general as used herein, near real-time will be sub-one second in length to meet human usability expectations and requirements.

For example, a near-real-time display depicts an event or situation as it existed at the current time less the processing time.

The distinction between near real time and real time varies and the delay is dependent on the type and speed of the transmission.

According to one embodiment a shopper is video-recorded in front of a mirror wearing a first item, e.g., a Calvin Klein necklace. Then, the shopper tries on the second item, e.g., a Tiffany necklace, and is recorded. At this point, the shopper can use the system to compare herself during the two fittings. Consider the Calvin Klein fitting as the first sequence. The system analyzes that first sequence against the second sequence recorded with the Tiffany necklace and matches similar frames. This creates a third sequence (made up of a "remix" of frames from the first sequence). On a display coupled to the system, the second and third sequences are played back to the user in close visual proximity.

Notably, since the system matches the two recorded sequences, poses such as a shopper lifting her arm, or turning her head, are matched as well. Thus, if in the first sequence the user compared her watch to the necklace by holding it up, and did similarly in the second sequence, during playback, those two matching poses will be shown simultaneously cued to the timing in the second sequence, irrespective of the time position in the first sequence where the similar pose occurred.

The system can include a user interface device (e.g., knob, on-screen touch control, etc.) to quickly jump positions within the sequence. Some embodiments may allow more than two fittings to be recorded before comparison shopping begins. In other embodiments, the second sequence is not prerecorded but is a live video sequence. Recorded images from the first sequence are matched to the current image of the live video of the second sequence in near real-time. Turning from this high-level description, the system will be described in greater detail in terms of the associated processes and user interaction.

System, Processes and User Interaction

FIG. 1A presents an exemplary process for robustly matching prerecorded video sequences in a retail clothing fitting system (batch mode). The process 100A starts with recording a first sequence of images (step 110); next, those images are stored (step 120). These basic steps repeat with the recording of a second sequence of images (step 130) and the storage of the same (step 140). A third sequence of images is now created by remixing frames from the first sequence to most closely match the second sequence (step 150). Finally, the second and third sequences are displayed in close visual proximity to one another (step 160).

The recording (step 110 and step 130) can occur with a single video camera capable of producing digital image sequences for computer processing. The storage (step 120 and step 140) can occur to any computer-readable storage medium.

The flow of process 100A from one step to another is typically dictated by one or more inputs, e.g., from a user. For example, a system executing process 100A may provide one or more user input devices for triggering starting-stopping of recording and triggering playback. In other embodiments, vision algorithms can detect gestures or other cues to trigger starting-stopping of recording and triggering playback.

Figure 1B:
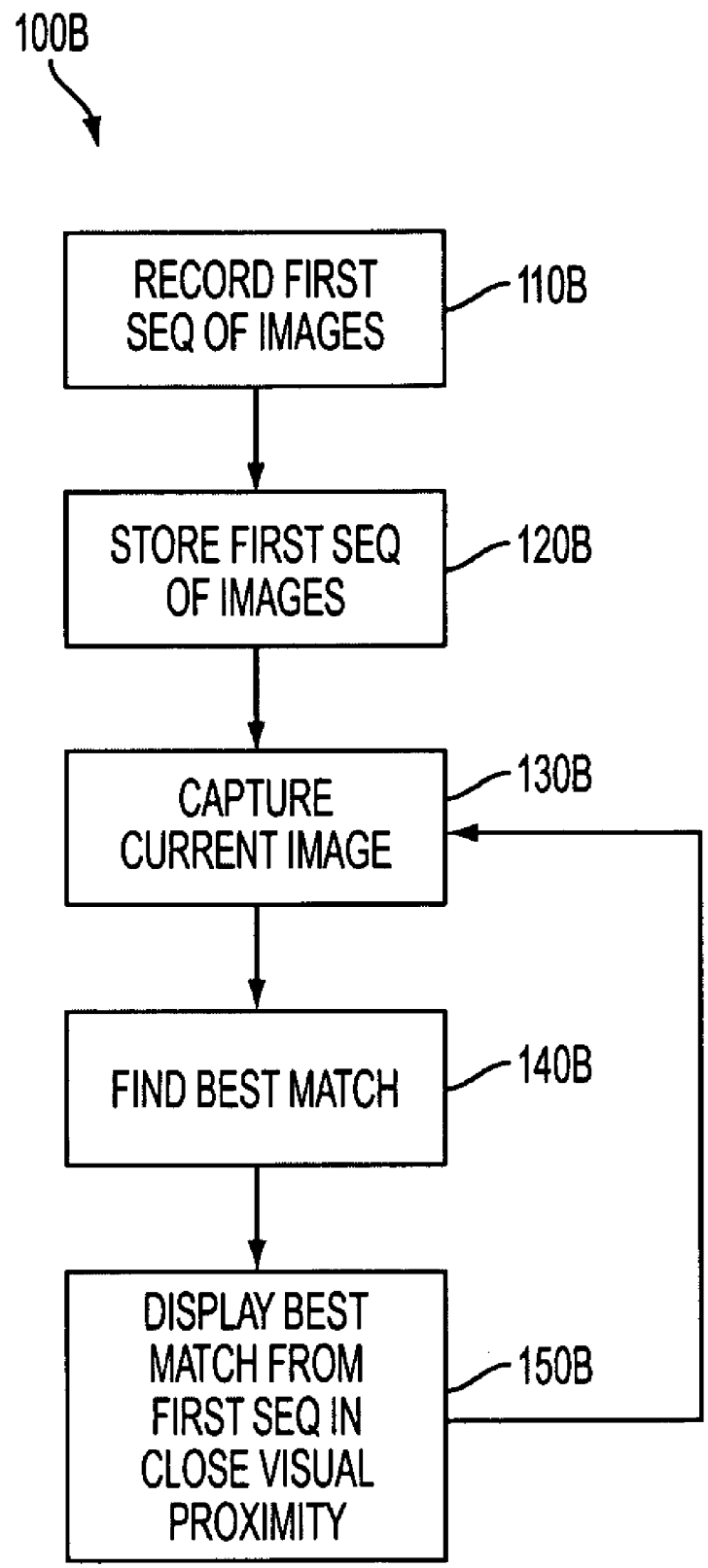
FIG. 1B presents an exemplary process for robustly matching a prerecorded video sequence to a live video sequence in a near real-time mode.

FIG. 1B presents an alternative exemplary process for robustly matching prerecorded video sequences to a live video sequence in a retail clothing fitting system. The process 100B starts with recording a first sequence of images (step 110B); next, those images are stored (step 120B). An image is then captured from a live video sequence (step 130B). Then, the best matching image in the first sequence to the captured image is found (step 140B). The matching image from the first sequence and the captured image from the live video are displayed in close visual proximity to one another (step 150B). Finally, this process iterates back to capturing a new image from the live video sequence (step 130B).

In some embodiments process 100A and process 100B execute concurrently. More specifically, steps 110-120 and steps 110B-120B can be identical (single recorded sequence) and then steps 130B-150B of process 100B can occur during steps 130-140 of process 100A.

Figure 2A:
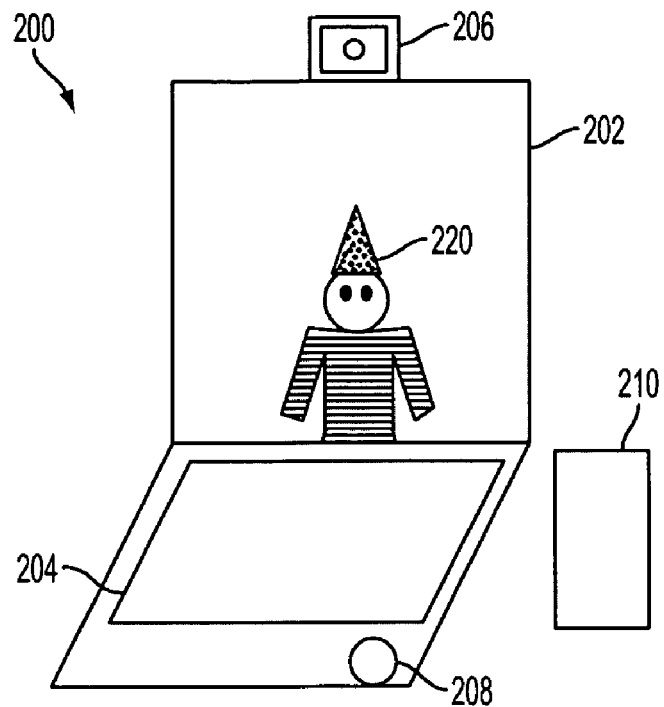
FIG. 2A illustrates a counter-top embodiment of a clothing comparison system.
Figure 2B:
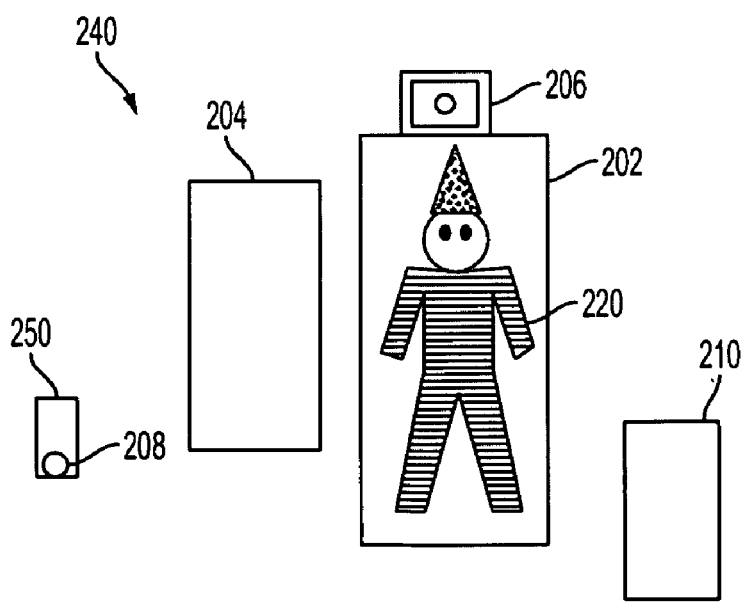
FIG. 2B illustrates a fitting room embodiment of a clothing comparison system.

FIGS. 2A-2B illustrate two embodiments of the clothing comparison system. More specifically, FIG. 2A illustrates a counter-top embodiment and FIG. 2B illustrates a fitting-room embodiment. The main difference between the two embodiments is the configuration and size of different pieces of the system. Note that either of these embodiments can be implemented with either the batch matching process of FIG. 1A or the near real-time matching process of FIG. 1B.

Each embodiment will be discussed in turn. For each embodiment, the elements of the figures will be discussed, then their interconnection. Finally, the usage of the system with reference to the processes 100A and 100B will be discussed for both embodiments collectively.

FIG. 2A is a counter-top embodiment of a system 200 for clothing comparison. The system 200 includes a mirror 202, a display 204, a camera 206, an input device 208, and a computer 210. For illustration purposes, the reflection of a user 220 is shown in the mirror 202. The interconnection of the components will now be described (note, the interconnections are not shown). The camera 206, the display 204, and the input device 208 are coupled in communication with the computer 210. In one embodiment, the counter-top embodiment of system 200 is designed and sized to sit on top of a display cabinet in a retail establishment, for example a jewelry store counter. In such an embodiment, all of the elements including computer 210—may be contained in a single housing. Additionally, the location of camera 206 can be adjusted as necessary to best capture what is shown in the mirror 202. In a further embodiment, input device 208 can be a knob that allows a user to scroll through two matched image sequences by turning the knob.

FIG. 2B is a fitting-room embodiment of a system 240 for clothing comparison. Similar components between FIG. 2A and FIG. 2B have been assigned the same number for easy reference; in many cases the components will have different dimensions between the two embodiments. System 240 includes a mirror 202, a display 204, a camera 206, an input device 208 (on a remote control 250) and a computer 210. Again, for illustration purposes, the reflection of a user 220 is shown in the mirror 202. As with FIG. 2A, interconnections between the elements are not shown. In one embodiment, the display 204 and the mirror 202 are mounted on a pedestal or stand (not shown). The remote control 250 may be wired or wireless. Additionally, the location of camera 206 can be adjusted as necessary to best capture what is shown in the mirror 202.

In one embodiment of the system 240 (or the system 200), there is no mandatory remote control, or other direct user input device. When the user walks in, the system 240 detects that she has walked in using the camera 206 and image analysis algorithms embodied in software executing on the computer 210 and starts recording the first sequence of images, or matching images. When she walks out, the system 240 detects this and stops recording. The next time the user walks in, she is detected and she gets recorded again, e.g. the second, or matching, sequence of images. This time the display 204 in close visual proximity to the mirror 202 will start to show the images from the first sequence matched to his current pose if the process 100B is being used. Such embodiments may include a time out, person recognition software, facial recognition software, and/or store personnel user input devices to handle detection of different users. Additionally, in user-input free embodiments that support the display of multiple prior fittings, all prior fitting sequences can be displayed simultaneously with the current fitting, only the most recent, and/or other options depending on alternate inputs such as store configuration settings preloaded into the computer 210 and/or an input device for store personnel.

For the remainder of this discussion, the focus will be on the counter-top embodiment of FIG. 2A, but the concepts should be understood to apply with equal force to the embodiment of FIG. 2B. In some embodiments, the mirror 202 is replaced with a display, e.g., a computer display, which shows the live output from camera 206 and thus acts like a mirror.

Figure 3A:
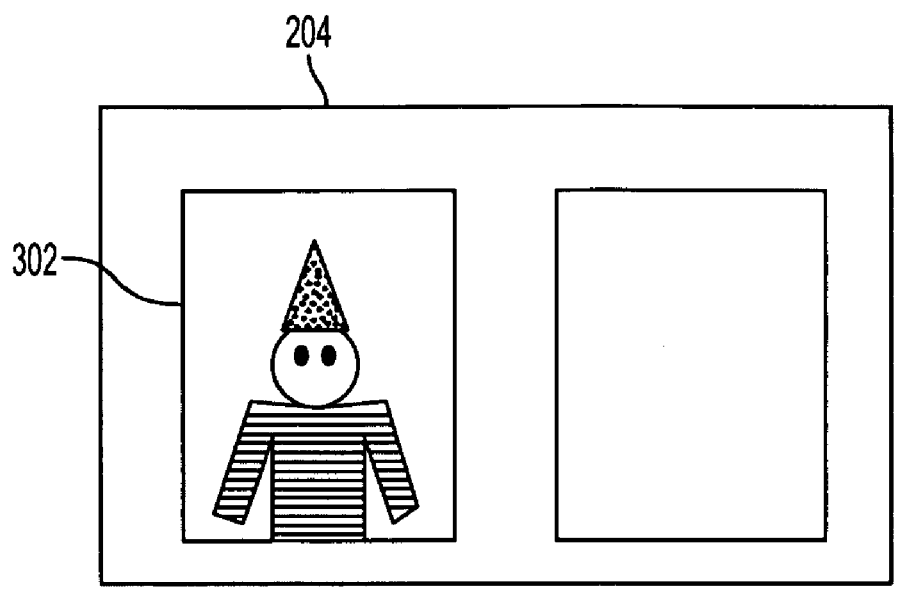
FIGS. 3A-3B illustrate a portion of the user interface of the clothing comparison system according to one embodiment.

Consider the process 100A of FIG. 1A in the context of the embodiment of the system 200 as shown in FIG. 2A. In this example, the shopper can stand, or sit down, in front of the system 200 with a first article of clothing. A hat will be used in this example. One or more user interface elements, e.g., depressing input device 208, a touchscreen control on display 204, or the like, can trigger recording of the first sequence (step 110) on the computer 210. In some embodiments, the recording may be motion or proximity triggered, based on processing of images from the camera 206 by the computer 210. The shopper can stop the recording using a user interface element, e.g., depressing input device 208, etc. At this point, the first sequence is recorded. Note that during the recording process, the shopper can change her positions, such as turning her head up, down, to the left, and to the right and moving her hands in various poses, so that images corresponding to different poses are captured by the system. In some embodiments, the recording (step 110) and storing (step 120) may occur in parallel (as opposed to waiting until the entire sequence is recorded to store). After this, the display 204 might look as shown in FIG. 3A, which shows the display 204 with one frame of the first sequence of images 302 (aka the matching sequence).

Figure 3B:
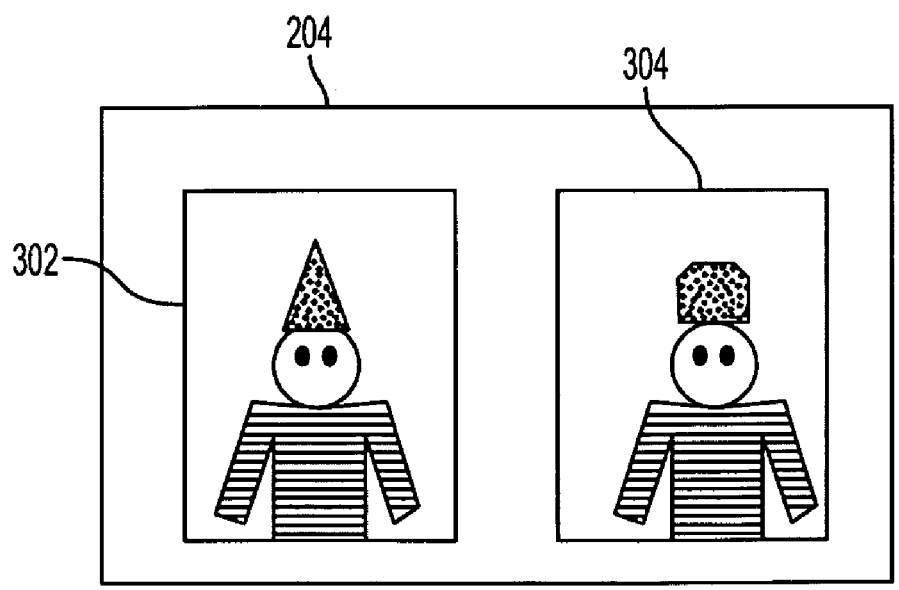

Further user input can trigger the recording and storing of the second sequence of images (step 130 and step 140). After which, the display 204 might look as shown in FIG. 3B which shows a frame of each sequence of frames side by side. Note in this example, the two sequences have a shopper who was trying on two different hats (a pointy hat and a domed hat). Process 100A then continues in response to a user input—or automatically on completion of recording of the second sequence of images 304—with the matching (step 150) and displaying of the two fittings side by side (step 160). The algorithms and techniques used in step 150 and step 140B will be described, infra.

For example, in one embodiment the display 204 comprises a touchscreen and provides user interface inputs for (i) starting a new session (e.g., a new shopper restarts the process 100A); (ii) starting and stopping recording of sequences, triggering matching (step 150); and (iii) playback position adjustment (can replace a physical input device 208).

Some features and some embodiments will now be discussed:

- The two sequences of images can be recorded at drastically different times—or even in different shops, allowing cross-store comparison if both systems have access to the earlier stored sequence of images.
- During the recording process the shopper is able to pose in various ways; the matching (step 150) accommodates the two sequences having different poses and even for the user to be at a different position (left/right/up/down, i.e., translation) from the camera between the two sequences.
- Some embodiments support recording and matching across more than two sequences. Such embodiments modify the process 100A to allow recording of more than two sequences and modify the process 100A to add a step prior to the matching (step 150), where two videos will be selected for matching/playback.
- Some embodiments support matching of more than one image sequence to a base sequence. These embodiments can playback, in close visual proximity, multiple image sequences that are all matched to the base sequence. Furthermore, the base sequence can be captured images from live video.
- Some embodiments will trigger the flow through process 100A or process 100B without explicit user interaction, but instead can be triggered by detecting gestures or other visual cues from the camera. For example, in one embodiment, the presence of a person within the field of view of the camera can trigger the start of a recording while the absence of a person within the field of view can trigger the stopping of a recording. Also, the motion of a person can trigger the matching process and playback of a matched sequence of images.

Figure 4:
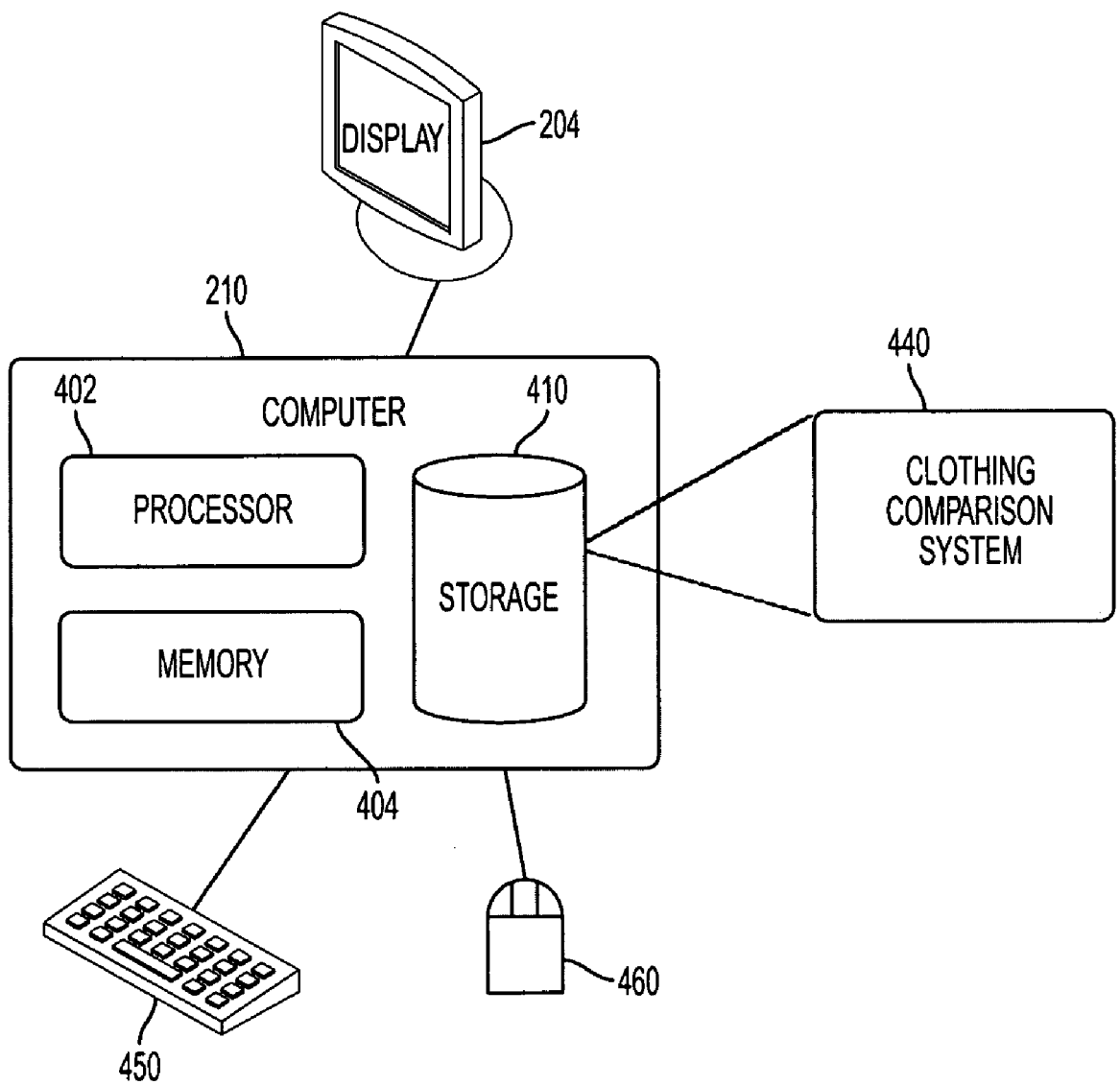
FIG. 4 illustrates a computer used by some embodiments.

FIG. 4 illustrates the computer 210 used by embodiments in more detail. The computer 210 includes a processor 402, a memory 404, a storage 410, the display 204, as well as two input devices: a keyboard 450 and a pointing device 460. The storage 410 includes a clothing comparison system 440. Network resources and other communication resources of the computer 210 are not shown, for simplicity. The computer 210 can be any commercial off-the-shelf computer suitably modified and/or programmed to support the clothing comparison system 440, the associated hardware to perform the recording of image sequences and playback, such as seen in system 200 of FIGS. 2A-B. The clothing comparison system 440 implements the process 100A of FIG. 1A and can be stored on any computer-readable storage medium as a sequence of instructions for controlling the processor 402 and coordinating the computer 210 and the components of the system 200. The input devices shown (keyboard 450 and pointing device 460) are exemplary only, as seen in FIGS. 2A-B, other input devices are possible such as making the display 204 a touchscreen display, input device 208 (e.g., a knob), a remote control 250, detection of visual cues from the camera, etc. Depending on the desired embodiment, the computer 210 would be coupled to such input devices.

Now the matching algorithms used by some embodiments will be discussed.

Matching Algorithms

The matching algorithms used by embodiments of the invention will now be described. Some prior image-matching approaches for comparison shopping have focused on body part/clothing matching and extraction of clothing vs. person. Additionally, such techniques have often required multiple cameras.

Embodiments of the invention eliminate the step of determining body pose, and instead compare the images as a whole by developing a distance measure between two frames. In one embodiment, an L2 distance measure which is the sum of squared pixel differences is used to compare image frames. Specifically, the L2 distance d between two images $I_1$ and $I_2$ (each from an image sequence) is given by Equation 1:

$$d(I_1, I_2) = \sum_{(x,y) \in P} (I_1(x, y) - I_2(x, y))^2 \quad (1)$$

In other words, the value of each pixel in $I_1$ is subtracted from the value of the corresponding pixel in $I_2$; that difference is then squared and summed across all pixels (P).

In one embodiment, the above matching is used in step 150 by selecting the two frames with the smallest difference. Specifically, consider a first (matching) sequence of images a, b, . . . m and a second (base) sequence of images A, B, . . . Z. Turning to the first image in the third sequence that will be shown side by side with the first image in the second sequence, the L2 distance between each of a . . . m can be compared with A and the smallest distance image chosen. The same can be done for all images in the second sequence, producing the third sequence which might look like m, a, c, d, d, d, . . . and would be the same length as the second sequence.

A translation invariant modification of the L2 distance is described by Equation 2:

$$d(I_1, I_2) = \min_{\Delta x, \Delta y} \sum_{(x,y) \in P} \min \left\{ \begin{array}{l} (I_1(x, y) - I_2(x, y))^2 \\ (I_1(x, y) - I_2(x + \Delta x, y + \Delta y))^2 \end{array} \right\} \quad (2)$$

Here, $\Delta x$ and $\Delta y$ are pixel offsets in the x and y directions. The set of values over which $\Delta x$ and $\Delta y$ can range can vary in different embodiments:

- brute force of fixed maximum translation amount, e.g., check ±50 pixels in all directions to find the best match in that bound;
- directed search, e.g., check all eight adjacent 1 pixel translations, then check all eight around the best of those eight, etc., up to a fixed maximum distance and/or a bounded amount of computation time; or gradient descent search of various Δx and Δy values to try various larger translations and then fine tune the translation.

While allowing for translation improves the match quality, it increases the computational cost of finding matching images between the sequences.

In one embodiment, the L2 distance with translation invariance handling is used as the matching of step 150. The matching would occur as described for the simpler L2 variant example, supra.

The above two approaches do not provide any emphasis to the smoothness of the video playback of the third sequence. Since the first sequence has been remixed to best match the second sequence, there may be a large amount of jitter or other artifacts that make the overall side by side playback less than ideal. Or put differently, the best matching frame, e.g., as given by Equation 1 or Equation 2, may not provide smooth video playback due to too much interframe jitter in the third sequence. Accordingly, some embodiments further refine the matching to account for smoothness.

Figure 5:
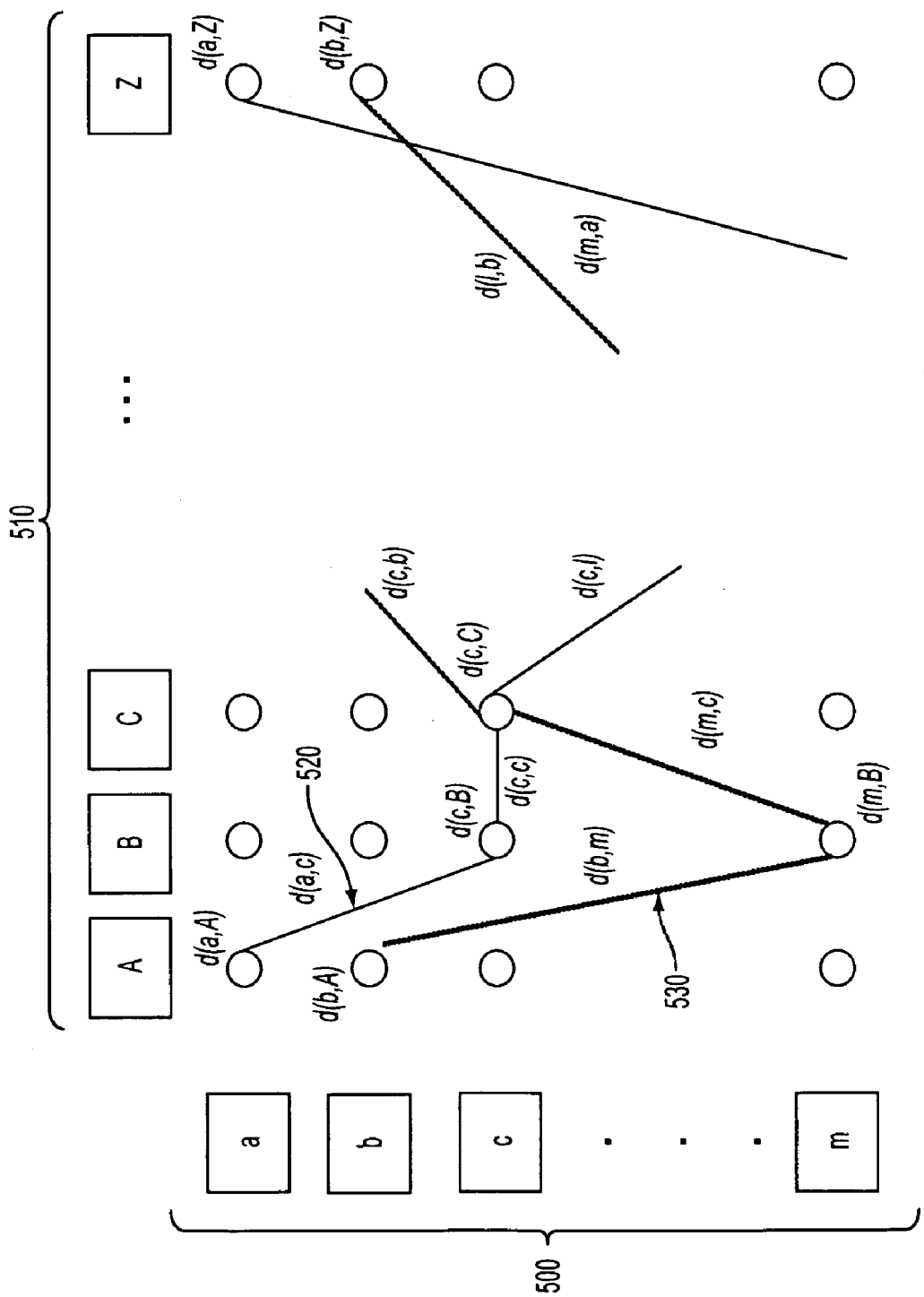
FIG. 5 illustrates a path encoding technique used by some embodiments to improve matching smoothness.

One such embodiment will be described with reference to FIG. 5 which illustrates a path-encoding technique used by some embodiments to improve matching smoothness. FIG. 5 includes a first sequence of images 500 with images a, b, c, . . . m (aka matching), and a second sequence of images 510 with images A, B, C, . . . Z (aka base).

The distances between frames of the different sequences are: d(a,A), d(a,B), . . . d(m,A), . . . d(m,Z). And are shown on the circular nodes in FIG. 5. The intra-sequence distance are d(a,a), d(a,b), d(a,c), etc. These are shown on the paths linking the circular nodes. A path distance can be computed by summing these distances. Returning to FIG. 5, two sample paths are partially shown, path 520 (solid lines) and path 530 (dashed lines), each annotated with distance measures. The best path is then the path with the minimum total distance.

The distance formula used can be the L2 distance, or modified L2 distance, of Equation 1 or 2, or one or more other distance measures, e.g., entropy, mutual information, and/or Kullback-Leibler distance. In some embodiments, different distance measures are used for intra- as opposed to inter-sequence comparisons, for example L2 distance for intra-sequence comparison and translation invariant L2 for inter-sequence comparison. In other embodiments, distances can be weighted to vary the effect of intra- and inter-sequence distances.

Of the $M^N$ possible paths (N=number of images in second (base) sequence, M=number of images in first (matching) sequence), the solution can be reformulated as a sequence-decoding problem using the Viterbi algorithm and the shortest path identified in $O(N \times M^2)$ time. The resultant path, e.g., path 520, is then used to construct the third sequence of images at step 150 of process 100A.

In the case of process 100B, step 140B can make use of the distance functions discussed above to determine the closest match with images in the first sequence. In some embodiments the match determined in step 140B can be re-used if process 100A is being performed simultaneously, thus allowing the third sequence at step 150 to be cogenerated with step 140B. Now some additional embodiments of the invention will be discussed.

Alternative Embodiments and Conclusion

Embodiments of the system 200 are capable of being supplied by a single vendor in a unitary housing custom-designed for the comparison shopping system and processes. Other embodiments are assembled from off-the-shelf parts such as a generally available computer, camera, display, and mirror and used in conjunction with the proprietary clothing comparison system 440 to provide the user interface and implement process 100.

In some embodiments, where the mirror is dispensed of entirely, a single display is used. In such embodiments, during the recording steps of process 100, the display shows a near real-time image of what the camera is capturing. Then for the displaying steps, the single display is used to play back the two sequences. This embodiment may be more appropriate for a home-version of the clothing comparison system 440, or for pre-recording one or more base sequences at home using commercial off-the-shelf computers. For example, in one such embodiment, using a home laptop computer such as an Apple MacBook (with a built-in camera), the shopper could record herself in multiple outfits she already owns. The recorded base sequences could be stored in a network storage accessible to the store system or in a computer-readable storage medium such as a removable SD card that the user brings to the store. A "reverse" variation of the single display embodiments may be useful if the shopper records multiple fittings at different stores (again storing the recorded sessions in a network storage accessible to the clothing comparison system 440), or on a computer-readable storage medium she brought to each store. The home computer (e.g., MacBook) could then implement the remaining steps of process 100 using the previously recorded image sequences.

Both of the above types of embodiments have different use cases. The "forward" variation is particularly useful if the user is interested in being able to determine how something new she is buying compares with something she already has (too similar, not as flattering, etc.). The reverse variation is useful for cross-comparison across multiple stores, e.g., trying on wedding dresses at five boutiques.

Recapping, a high-level description of one embodiment was discussed using a necklace example. Then, a process and two system embodiments were described in greater detail with a reference to the user interaction. Specifically, a counter-top embodiment more suitable for comparison shopping for smaller clothing, jewelry and accessories was described, as was a fitting-room embodiment more suitable for comparison shopping of larger clothing such as full outfits. Then, details of image-matching algorithms used by embodiments were discussed. Specifically, an L2 distance measure and a translation invariant version were discussed to robustly match images with similar body and head pose. A modification that improves smoothness, and avoids jitter, in the playback of the resultant sequence was discussed, along with a fast algorithm for finding such a sequence. Lastly, various alternative embodiments were discussed.

The data structures and code described, supra, are stored according to many embodiments on a computer-readable storage medium, which may be any device or medium that can store code and/or data for use by a computer system. This includes, but is not limited to, volatile memory, non-volatile memory, application-specific integrated circuits (ASICs), field-programmable gate arrays (FPGAs), magnetic and optical storage devices such as disk drives, magnetic tape, CDs (compact discs), DVDs (digital versatile discs or digital video discs), or other media capable of storing computer-readable media now known or later developed.

The preceding description is presented to enable one skilled in the art to make and use the invention. Various modifications to the disclosed embodiments will be apparent, and the general principles defined herein may be applied to other embodiments and applications without departing from the spirit and scope of the present invention. Thus, the present invention is not intended to be limited to the embodiments shown, but is to be accorded the widest scope consistent with the principles and features disclosed herein. The scope of the present invention is defined by the appended claims.

What is claimed is:

1. A computer-implemented method for video matching for comparison shopping, comprising:
    recording a first sequence of images of a user wearing a first piece of clothing, jewelry, or other wearable item in front of a single camera;
    storing the first sequence of images;
    recording a second sequence of images of the user wearing a second piece of clothing, jewelry, or other wearable item in front of the single camera;
    storing the second sequence of images;
    identifying, for each image in the second sequence of images, one or more matching images in the first sequence of images according to a matching algorithm;
    generating a third sequence of images from the first sequence of images, wherein the third sequence of images includes the matching images ordered based on their corresponding sequence number from the second sequence, and wherein the matching images are selected so that two consecutive images in the third sequence have a minimum pixel difference from each other; and
    displaying the second sequence of images and the third sequence of images to the user in close visual proximity to each other to permit the user to compare how they look in the first piece and the second piece of clothing, jewelry, or other wearable item.

2. The method of claim 1, wherein the displaying is user-controllable responsive to a first user input device to adjust position with the second and third sequence of images.

3. The method of claim 2, wherein the first user input device comprises a remote control.

4. The method of claim 1, the displaying further comprises displaying a plurality of additional sequences of images in close visual proximity to the second sequence of images and the third sequence of images; wherein the additional sequences are of the user wearing clothing or jewelry and wherein the additional sequences matched to the second sequence of images.

5. The method of claim 1, wherein the recording of the first sequence of images and the second sequence of images occurs in front of a mirror used for trying on the first piece and second piece of clothing or jewelry.

6. The method of claim 1, wherein the first user input device comprises a dial permitting forward or backward adjustment of playback point within the second and third sequence of images.

7. The method of claim 1, wherein the matching algorithm computes the sum of the square of pixel differences between all images as adjusted by a delta to handle a single translation to identify the closest image as the matching image.

8. The method of claim 1, wherein the matching algorithm accounts for the smoothness of video playback of the third sequence of images.

9. The method of claim 8, wherein the matching comprises translating the problem into a sequence-decoding problem and solving the problem using the Viterbi algorithm.

10. The method of claim 9, wherein the translating comprises:
    applying a weight to each vertex equal to a sum of the square of pixel differences between a frame from the first sequence and a frame from the second sequence; and
    applying a weight to each edge equal to the sum of the square of pixel differences between frames of the first sequence of images of the two vertices of the edge.

11. A system for video matching for comparison shopping, comprising:
    a first display or mirror;
    a single camera, the single camera proximal to the first display or mirror;
    a second display, the second display in visual proximity to the first display;
    a first user input device; and
    a computer system for:
        recording a first sequence of images of a user wearing a first piece of clothing, jewelry, or other wearable item in front of the first display or mirror and the single camera;
        storing the first sequence of images;
        recording a second sequence of images of the user wearing a second piece of clothing, jewelry, or other wearable item in front of the first display or mirror and the single camera;
        storing the second sequence of images;
        identifying, for each image in the second sequence of images, one or more matching images in the first sequence of images according to a matching algorithm,
        generating a third sequence of images from the first sequence of images, wherein the third sequence of images includes the matching images ordered based on their corresponding sequence number from the second sequence, and wherein the matching images are selected so that two consecutive images in the third sequence have a minimum pixel difference from each other; and
        displaying the second sequence of images and the third sequence of images to the user in close visual proximity to each other to permit the user to compare how they look in the first piece and the second piece of clothing, jewelry, or other wearable item, wherein the displaying is user-controllable responsive to the first user input device to adjust position with the second and third sequence of images.

12. The system of claim 11, wherein the first display or mirror comprises a display and wherein, during the recording of the first and second sequences of images, the first display serves to show the sequence being recorded.

13. The system of claim 12, wherein the displaying comprises showing one sequence on the first display and another sequence on the second display.

14. The system of claim 11, wherein the first display or mirror comprises a mirror and wherein the displaying comprises showing both sequences on the second display.

15. The system of claim 11, wherein the first user input device comprises a dial permitting adjusting playback position within the second and third sequence during the displaying.

16. The system of claim 11, wherein the second display comprises a touchscreen display for receiving user input and wherein the first user input device comprises an onscreen control.

17. The system of claim 11, wherein the matching algorithm computes the sum of the square of pixel differences between all frames as adjusted by a delta to handle a single translation to identify the closest frame.

18. The method of claim 11, wherein the matching algorithm accounts for the smoothness of video playback of the third sequence of images.

19. A computer-readable storage medium storing instructions that when executed by a computer cause the computer to perform a method for video matching for comparison shopping, comprising:
- a first set of instructions for recording a first sequence of images of a user wearing a first piece of clothing, jewelry, or other wearable item in front of a single camera;
- a second set of instructions for storing the first sequence of images;
- a third set of instructions for recording a second sequence of images of the user wearing a second piece of clothing, jewelry, or other wearable item in front of the single camera;
- a fourth set of instructions for storing the second sequence of images;
- a fifth set of instructions for:
  - identifying for each image in the second sequence of images, one or more matching images in the first sequence of images according to a matching algorithm and
  - generating a third sequence of images from the first sequence of images, wherein the third sequence of images includes the matching images ordered based on their corresponding sequence number from the second sequence, and wherein the matching images are selected so that two consecutive images in the third sequence have a minimum pixel difference from each other;
- a sixth set of instructions for displaying the second sequence of images and the third sequence of images to the user in close visual proximity to each other to permit the user to compare how they look in the first piece and the second piece of clothing, jewelry, or other wearable item; and
- a seventh set of instructions for controlling the displaying responsive to a first user input device to adjust position with the second and third sequence of images.

20. The computer-readable storage medium of claim 19, wherein the fifth set of instructions further comprises a set of instructions for computing the sum of the square of pixel differences between all images as adjusted by a delta to handle a single translation to identify the closest image.

21. The computer-readable storage medium of claim 19, wherein the fifth set of instructions accounts for the smoothness of video playback of the third sequence of images.

22. The computer-readable storage medium of claim 21, wherein the fifth set of instructions further comprises a set of instructions for translating the problem into a sequence-decoding problem and solving the problem using the Viterbi algorithm.

23. A computer-implemented method for near real-time video matching for comparison shopping, comprising:
- recording a first sequence of images of a user wearing a first piece of clothing, jewelry, or other wearable item in front of a single camera;
- storing the first sequence of images;
- obtaining an image of the user wearing a second piece of clothing, jewelry, or other wearable item in front of the single camera;
- identifying a matching image in the first sequence that matches the obtained image according to a matching algorithm and that has a minimum pixel difference to an image from the first sequence being displayed to the user; and
- displaying the matching image in close visual proximity to the display of the obtained image to permit the user to compare how they look in the first piece and the second piece of clothing, jewelry, or other wearable item, the displaying occurring in near real-time to the obtaining.

24. The computer-implemented method of claim 23, further comprising repeating the obtaining, matching and displaying until a signal is received.

25. The computer-implemented method of claim 24, wherein the signal generated responsive to detecting the user has ended fitting of the second item of clothing, jewelry, or other wearable item.

26. A system for video matching for near real-time comparison shopping, comprising:
- a first display or mirror;
- a single camera, the single camera proximal to the first display or mirror;
- a second display, the second display in visual proximity to the first display;
- a computer system for:
  - recording a first sequence of images of a user wearing a first piece of clothing, jewelry, or other wearable item in front of a single camera;
  - storing the first sequence of images;
  - obtaining an image of the user wearing a second piece of clothing, jewelry, or other wearable item in front of the single camera;
  - identifying a matching image in the first sequence that matches the obtained image according to a matching algorithm and that has a minimum pixel difference to an image from the first sequence being displayed to the user sequence; and
  - displaying the matching image in close visual proximity to the display of the image to permit the user to compare how they look in the first piece and the second piece of clothing, jewelry, or other wearable item, the displaying occurring in near real-time to the obtaining.

27. The system of claim 26, wherein the computer system further comprising:
- detecting people or poses using image analysis algorithms on input from the single camera; and
- controlling the recording, the storing, the obtaining, the identifying and the displaying responsive to the displaying.

28. The system of claim 26, wherein the system further comprises a first user input device and wherein the displaying is user-controllable responsive to the first user input device to cause the recording, the storing, the obtaining, the identifying and the displaying to start, stop, or repeat.

29. The system of claim 26, wherein the matching algorithm computes the sum of the square of pixel differences between the image and all images in the first sequence of images as adjusted by a delta to handle a single translation to identify the closest image as the matching image.

30. The system of claim 26, wherein the matching algorithm accounts for the smoothness of video playback of the displaying repeated across multiple repetitions of the obtaining, identifying and displaying.

* * * * *